US010460470B2

(12) United States Patent
Liu et al.

(10) Patent No.: US 10,460,470 B2
(45) Date of Patent: Oct. 29, 2019

(54) RECOGNITION AND RECONSTRUCTION OF OBJECTS WITH PARTIAL APPEARANCE

(71) Applicant: Futurewei Technologies, Inc., Plano, TX (US)

(72) Inventors: Lifeng Liu, Sudbury, MA (US); Xiaotian Yin, Belmont, MA (US); Yingxuan Zhu, Cambridge, MA (US); Jun Zhang, Cambridge, MA (US); Jian Li, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 182 days.

(21) Appl. No.: 15/643,453

(22) Filed: Jul. 6, 2017

(65) Prior Publication Data

US 2019/0012802 A1    Jan. 10, 2019

(51) Int. Cl.
*G06K 9/00* (2006.01)
*G06T 7/73* (2017.01)
*G06K 9/62* (2006.01)
*G06K 9/68* (2006.01)

(52) U.S. Cl.
CPC ............ *G06T 7/73* (2017.01); *G06K 9/00664* (2013.01); *G06K 9/6256* (2013.01); *G06K 9/6274* (2013.01); *G06K 9/6857* (2013.01); *G06T 2207/20081* (2013.01); *G06T 2207/20084* (2013.01)

(58) Field of Classification Search
CPC ............ G06T 7/73; G06T 2207/20081; G06T 2207/20084
See application file for complete search history.

(56) References Cited

U.S. PATENT DOCUMENTS

| 8,532,390 B2* | 9/2013 | Brown ............... G06K 9/00369 |
| | | 382/190 |
| 9,076,065 B1 | 7/2015 | Vijayanarasimhan |
| 9,600,745 B2* | 3/2017 | Sakurai ............ G06K 9/00362 |
| 2010/0027892 A1* | 2/2010 | Guan ................. G06K 9/00355 |
| | | 382/203 |
| 2016/0148080 A1 | 5/2016 | Yoo et al. |

(Continued)

FOREIGN PATENT DOCUMENTS

CN    102915453 A    2/2013

OTHER PUBLICATIONS

Mohan et al., "Example-based object detection in images by components", IEEE, vol. 23, No. 4, Apr. 2001; pp. 349-361.*

(Continued)

*Primary Examiner* — Shefali D Goradia
(74) *Attorney, Agent, or Firm* — Schwegman Lundberg & Woessner, P.A.

(57) ABSTRACT

Various embodiments include systems and methods structured to provide recognition of an object in an image using a learning module trained using decomposition of the object into components in a number of training images. The training can be based on an overall objectness score of the object, an objectness score of each component of the object, a pose of the object, and a pose of each component of the object for each training image input. Additional systems and methods can be implemented in a variety of applications.

18 Claims, 10 Drawing Sheets

(56) References Cited

U.S. PATENT DOCUMENTS

2016/0210530 A1 7/2016 Li et al.

OTHER PUBLICATIONS

Deng, Li, "A tutorial survey of architectures, algorithms, and applications for deep learning", *APSIPA Transactions on Signal and Information Processing*, vol. 3, e2, (2014), 1-29.

Kong, Shu, "A Story from Saliency to Objectness and Extension by Deep Neural Network with Perspective and Doubt", Vision Group, UCI. [online]. [archived on Jul. 3, 2015]. Retrieved from the Internet: <URL: http://www.ics.uci.edu/~skong2/img/CVgourp_20141106.pdf>, (Nov. 6, 2014), 23 pgs.

Liang, Ming, et al., "Recurrent Convolutional Neural Network for Object Recognition", *2015 IEEE Conference on Computer Vision and Pattern Recognition (CVPR)*, (2015), 3367-3375.

Ranjan, Rajeev, et al., "A Deep Pyramid Deformable Part Model for Face Detection", *2015 IEEE 7th International Conference on Biometrics Theory, Applications and Systems (BTAS)*, (2015), 8 pgs.

Ren, Shaoqing, et al., "Faster R-CNN: Towards Real-Time Object Detection with Region Proposal Networks", *IEEE Transactions on Pattern Analysis and Machine Intelligence*, 39(6)., (2017), 1137-1149.

Szegedy, Christian, et al., "Deep Neural Networks for Object Detection", In: *Advances in Neural Information Processing Systems*, (2013), 1-9.

Toshev, Alexander, et al., "DeepPose: Human Pose Estimation via Deep Neural Networks", *2014 IEEE Conference on Computer Vision and Pattern Recognition*, (2014), 1653-1660.

Wang, Lijun, et al., "Deep Networks for Saliency Detection via Local Estimation and Global Search", *2015 IEEE Conference on Computer Vision and Pattern Recognition (CVPR)*, (2015), 3183-3192.

Wang, Lijun, et al., "Deep Networks for Saliency Detection via Local Estimation and Global Search", Supplemental Material, *2015 IEEE Conference on Computer Vision and Pattern Recognition (CVPR)*, (2015), 10 pgs.

"International Application No. PCT/CN2018/092376, International Search Report and Written Opinion dated Sep. 20, 2018", (dated Sep. 20, 2018), 10 pgs.

* cited by examiner

RECOGNITION AND RECONSTRUCTION OF OBJECTS WITH PARTIAL APPEARANCE

FIELD OF THE INVENTION

The present disclosure is related to image recognition.

BACKGROUND

In an image, an object can have a partial appearance as part of the image. For instance, the object may be occluded by other objects or background in the image. For example, the full appearance of an animal may be blocked by grasses, shrubs, or other items in the environmental setting in which the animal is located in the image. In another scenario, there can be objects on the boundary of an image with partial appearance due to the limits of the field of view of the sensors. In an image of a collision between a car and a bicycle, the image may include a front end of the car and a back end of the bicycle such that there is only a partial appearance of the car and the bicycle. With such partial appearances, a recognition system may have difficulty in determining the object in an image submitted to the recognition system. In addition to partial appearances, a distorted object in an image or an object with a pose different from alignment with an axis of the image, may present difficulties for the recognition system. A pose of an object in an image is a relative position/orientation of the object with respect to a predefined identity pose and representing its relationship to other objects or background in the image.

SUMMARY

Systems and methods can be implemented to recognize and reconstruct objects in an image, where the systems and methods address appearance variation, orientation variation, and occlusion of portions of the object in the image. A learning module can be used in the recognition and reconstruction of the object with the learning module arranged as a component-based training module. The learning module can be trained to recognize objects using a set of training images in which the object in the images of the set are decomposed into components and using label data regarding the objects. The training can be based on an overall objectness score of the object, an objectness score of each component of the object, a pose of the object, and a pose of each component of the object for each image input into the training module. An objectness score can be associated with a probability of an image or image window containing a specified object or a component of the object.

According to one aspect of the present disclosure, there is provided a system operable to recognize and reconstruct objects in images, the system comprising: a non-transitory memory storage comprising instructions; and one or more processors in communication with the non-transitory memory storage, wherein the one or more processors execute the instructions to perform operations comprising: acquiring a plurality of images, each image including an object within the image, the object having a different appearance in a number of images of the plurality of images; decomposing, for each image, the object into components and generating label data for each image; inputting the images and associated label data into a learning module to train the learning module to recognize the components of the object, the training being based on an overall objectness score of the object, an objectness score of each component of the object, a pose of the object, and a pose of each component of the object for each image input; inputting an additional image into the trained learning module; detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components.

Optionally, in any of the preceding aspects, another implementation of the aspect provides that the operations include creating synthetic images as new training images by combining components detected from multiple images.

Optionally, in any of the preceding aspects, a further implementation of the aspect provides that decomposing the object in the images into components includes using a user interface to provide user input to decompose the object into the components.

Optionally, in any of the preceding aspects, a further implementation of the aspect provides that providing user input to decompose the object into components includes using one or more actions from a set of actions, the set including using heuristics to decompose the object, using a guess of a best fit from generated or matched existing decomposed candidates, and manually decomposing a number of typical examples.

Optionally, in any of the preceding aspects, a further implementation of the aspect provides that the learning module is a deep neural network.

Optionally, in any of the preceding aspects, a further implementation of the aspect provides that training the deep neural network includes training the deep neural network having one sub-neural network per component.

Optionally, in any of the preceding aspects, a further implementation of the aspect provides that training the deep neural network includes inputting the images and associated label data to a first convolution layer of a plurality of convolution layers i, i=1, . . . n−1, n arranged in series such that input to each convolution layer includes an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and n, and the region proposals for the object in whole.

Optionally, in any of the preceding aspects, a further implementation of the aspect provides that the region of interest pooling includes a consistency checking among the region proposals for the object in whole and the region proposals for the components to discard inconsistent region proposals.

Optionally, in any of the preceding aspects, a further implementation of the aspect provides that the operations include performing regression of the overall objectness score of the object, the objectness score of each component of the object, the pose of the object, and the poses of the components based on output of region of interest (ROI) pooling.

Optionally, in any of the preceding aspects, a further implementation of the aspect provides that training the learning module includes minimizing a cost function generated as a sum of discrepancies between the label data and computed data for a set of items, the set of items including the overall objectness score, the objectness scores of the components, a pose of the object, and the poses of the components.

Optionally, in any of the preceding aspects, a further implementation of the aspect provides that the plurality of images includes one or more of a full appearance of the object, a partial appearance of the object, an orientation variation of the object, or an appearance variation of the object.

Optionally, in any of the preceding aspects, a further implementation of the aspect provides that acquiring the plurality of images includes creating training images of the object with partial appearance of the object in the training images and labeling the training images with pose information from creating the training images or labeling the training images with pose information based on deformation descriptors from conducting an object template matching.

Optionally, in any of the preceding aspects, a further implementation of the aspect provides that constructing the complete view includes making a correspondence between an object template and a detected object having a partial appearance.

Optionally, in any of the preceding aspects, a further implementation of the aspect provides that constructing the complete view includes applying pose information from detecting that the additional image has one or more of the components of the object within the additional image and the additional image as input to a generative adversarial network (GAN) to reconstruct a full appearance of the object.

According to one aspect of the present disclosure, there is provided a computer-implemented method that includes: acquiring a plurality of images, each image including an object within the image, the object having a different appearance in a number of images of the plurality of images; decomposing, for each image, the object into components and generating label data for each image; inputting the images and associated label data into a learning module to train the learning module to recognize the components of the object, the training being based on an overall objectness score of the object, an objectness score of each component of the object, a pose of the object, and a pose of each component of the object for each image input; inputting an additional image into the trained learning module; detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components.

Optionally, in any of the preceding aspects, another implementation of the aspect provides that the method includes creating synthetic images as new training images by combining components detected from multiple images.

Optionally, in any of the preceding aspects, a further implementation of the aspect provides that decomposing the object in the images into components includes using a user interface to provide user input to decompose the object into the components.

Optionally, in any of the preceding aspects, a further implementation of the aspect provides that providing user input to decompose the object into components includes using one or more actions from a set of actions, the set including using heuristics to decompose the object, using a guess of a best fit from generated or matched existing decomposed candidates, and manually decomposing a number of typical examples.

Optionally, in any of the preceding aspects, a further implementation of the aspect provides that the learning module is a deep neural network.

Optionally, in any of the preceding aspects, a further implementation of the aspect provides that training the deep neural network includes training the deep neural network having one sub-neural network per component.

Optionally, in any of the preceding aspects, a further implementation of the aspect provides that training the deep neural network includes inputting the images and associated label data to a first convolution layer of a plurality of convolution layers i, i=1, . . . n−1, n arranged in series such that input to each convolution layer includes an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and in, and the region proposals for the object in whole.

Optionally, in any of the preceding aspects, a further implementation of the aspect provides that the method includes performing regression of the overall objectness score of the object, the objectness score of each component of the object, the pose of the object, and the poses of the components based on output of region of interest pooling.

Optionally, in any of the preceding aspects, a further implementation of the aspect provides that training the learning module includes minimizing a cost function generated as a sum of discrepancies between the label data and computed data for a set of items, the set of items including the overall objectness score, the objectness scores of the components, a pose of the object, and the poses of the components.

Optionally, in any of the preceding aspects, a further implementation of the aspect provides that acquiring the plurality of images includes acquiring one or more of a full appearance of the object, a partial appearance of the object, an orientation variation of the object, or an appearance variation of the object.

Optionally, in any of the preceding aspects, a further implementation of the aspect provides that acquiring the plurality of images includes creating training images of the object with partial appearance of the object in the training images and labeling the training images with pose information from creating the training images or labeling the training images with pose information based on deformation descriptors from conducting an object template matching.

Optionally, in any of the preceding aspects, a further implementation of the aspect provides that constructing the complete view includes making a correspondence between an object template and a detected object having a partial appearance.

Optionally, in any of the preceding aspects, a further implementation of the aspect provides that constructing the complete view includes applying pose information from detecting that the additional image has one or more of the components of the object within the additional image and the additional image as input to a generative adversarial network to construct a full appearance of the object.

According to one aspect of the present disclosure, there is provided a non-transitory computer-readable medium that stores computer instructions, that when executed by one or more processors, cause the one or more processors to perform the operations of: acquiring a plurality of images, each image including an object within the image, the object having a different appearance in a number of images of the plurality of images; decomposing, for each image, the object into components and generating label data for each image; inputting the images and associated label data into a learning module to train the learning module to recognize the components of the object, the training being based on an overall objectness score of the object, an objectness score of each component of the object, a pose of the object, and a pose of each component of the object for each image input; inputting an additional image into the trained learning module; detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components.

Optionally, in any of the preceding aspects, another implementation of the aspect provides that decomposing the object in the images into components includes using a user interface to provide user input to decompose the object into the components.

Optionally, in any of the preceding aspects, a further implementation of the aspect provides that the learning module is a deep neural network.

Optionally, in any of the preceding aspects, a further implementation of the aspect provides that training the deep neural network includes training the deep neural network having one sub-neural network per component.

Optionally, in any of the preceding aspects, a further implementation of the aspect provides that training the deep neural network includes inputting the images and associated label data to a first convolution layer of a plurality of convolution layers i, i=1, . . . n−1, n arranged in series such that input to each convolution layer includes an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and n, and the region proposals for the object in whole.

Optionally, in any of the preceding aspects, a further implementation of the aspect provides that the operations include performing regression of the overall objectness score of the object, the objectness score of each component of the object, the pose of the object, and the poses of the components based on output of region of interest pooling.

Optionally, in any of the preceding aspects, a further implementation of the aspect provides that training the learning module includes minimizing a cost function generated as a sum of discrepancies between the label data and computed data for a set of items, the set of items including the overall objectness score, the objectness scores of the components, a pose of the object, and the poses of the components.

Optionally, in any of the preceding aspects, a further implementation of the aspect provides that acquiring the plurality of images includes acquiring one or more of a full appearance of the object, a partial appearance of the object, an orientation variation of the object, or an appearance variation of the object, or acquiring the plurality of images includes creating training images of the object with partial appearance of the object in the training images and labeling the training images with pose information from creating the training images or labeling the training images with pose information based on deformation descriptors from conducting an object template matching.

DETAILED DESCRIPTION

Figure 1:
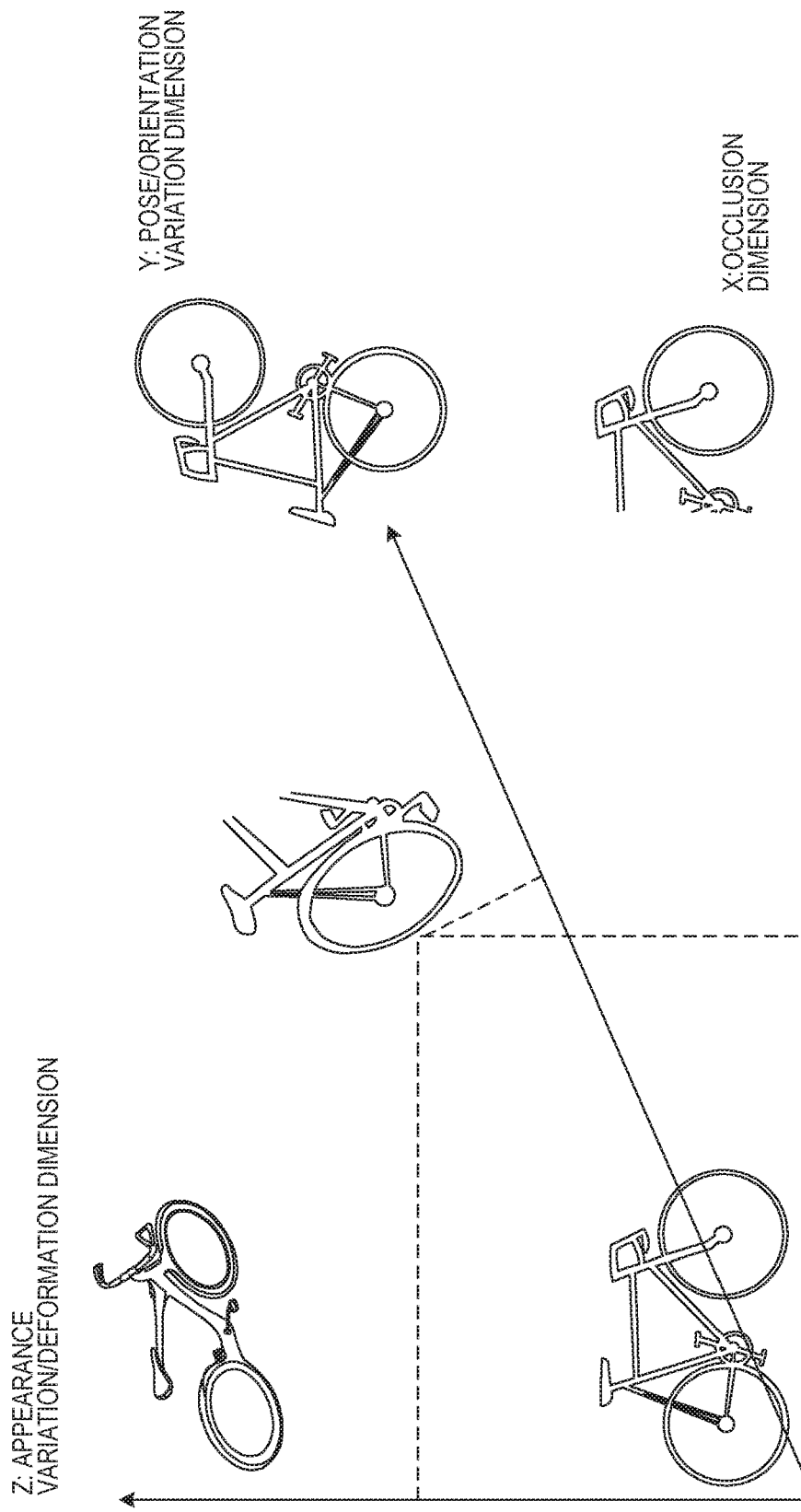
FIG. 1 is a pictorial representation of dimensional components associated with recognition of an object in an image, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, a system can be structured to perform operations including decomposition of an object in an image into one or more components of the object, training of a learning module to recognize the components of objects, and application of the learning module, by making use of learned components, to recognize objects in images submitted to the learning module in a non-training mode. An image may also be realized in the form of a video sequence, where the video sequence is a sequence of images. Decomposition of the object in the image can include human input, through a user interface, to aid in performance of the decomposition. The decomposition can include identifying a pose of the object in the image. Working with the object pose may include use of an object orientation bounding box.

Such systems can use component-decomposing to learn the object models, and deal with objects with partial appearance and orientation changes. These systems may achieve high performance in detecting and reconstructing occluded objects and learning new objects. For example, it is challenging for autonomous system to detect bicycles since bicycles are relatively small, fast, heterogeneous, with more appearance variations, and easy to be partially occluded. The component-decomposing based learning system can improve the performance of recognition and detection of objects (such as bicycles), and an autonomous system having a learning module to recognize and reconstruct objects more reliably in an image may be provided with the capability to generate prompt judgment and reaction to objects detected in transition in sensors of autonomous systems. Systems using learning modules trained from component-decomposing in images can provide robust identification of objects of interest that are occluded in an image. In addition, such systems can provide for improved overall understanding of a scene associated with an image having objects partially displayed in the image.

FIG. 1 is a pictorial representation of problem dimensionality associated with recognition of an object in an image. Along the x-axis is an occlusion dimension, which is a reflection of the fact that, in some images, there is only a partial appearance of the object in the image, where the whole layout of the object is represented at the origin. A layout is the manner in which the parts of an object are arranged. Along the y-axis is a pose/orientation variation dimension, which is a reflection of the fact that, in some images, the object is not oriented in the image in parallel with the frame of the image, as shown at the origin. Along the z-axis is an appearance variation/deformation dimension, which is a reflection of the fact that, in some images, the object is not shaped in the image as a non-deformation form of the object, as shown at the origin. The vector representation of the appearance of an object highlights the variables involved in recognizing an object in an image. With appearance variation, orientation variation, and occlusion all under consideration, it is challenging to detect and recover the object's whole layout.

Figure 2:
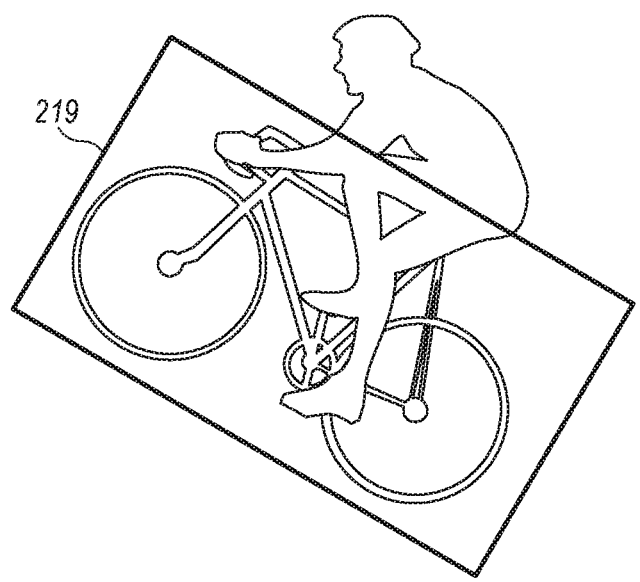
FIG. 2 shows an image of a boy on a bicycle in which the bicycle has been lifted into air at an angle from the ground, according to an example embodiment.

FIG. 2 shows an image of a boy on a bicycle in which the bicycle has been lifted into air at an angle from the ground. In conventional image processing techniques, the image of the bicycle is operated on by encasing the bicycle in a bounding box that is aligned with the image axis. However, taking the orientation of the bicycle as a variable, as taught herein, a bounding box 219 can be generated as an object orientation bounding box, indicating pose information. Such pose information can include an angle with respect to the background. This pose information can be taken into account in a learning module to train the learning module to recognize an object at various orientations or pose positions.

Figure 3:
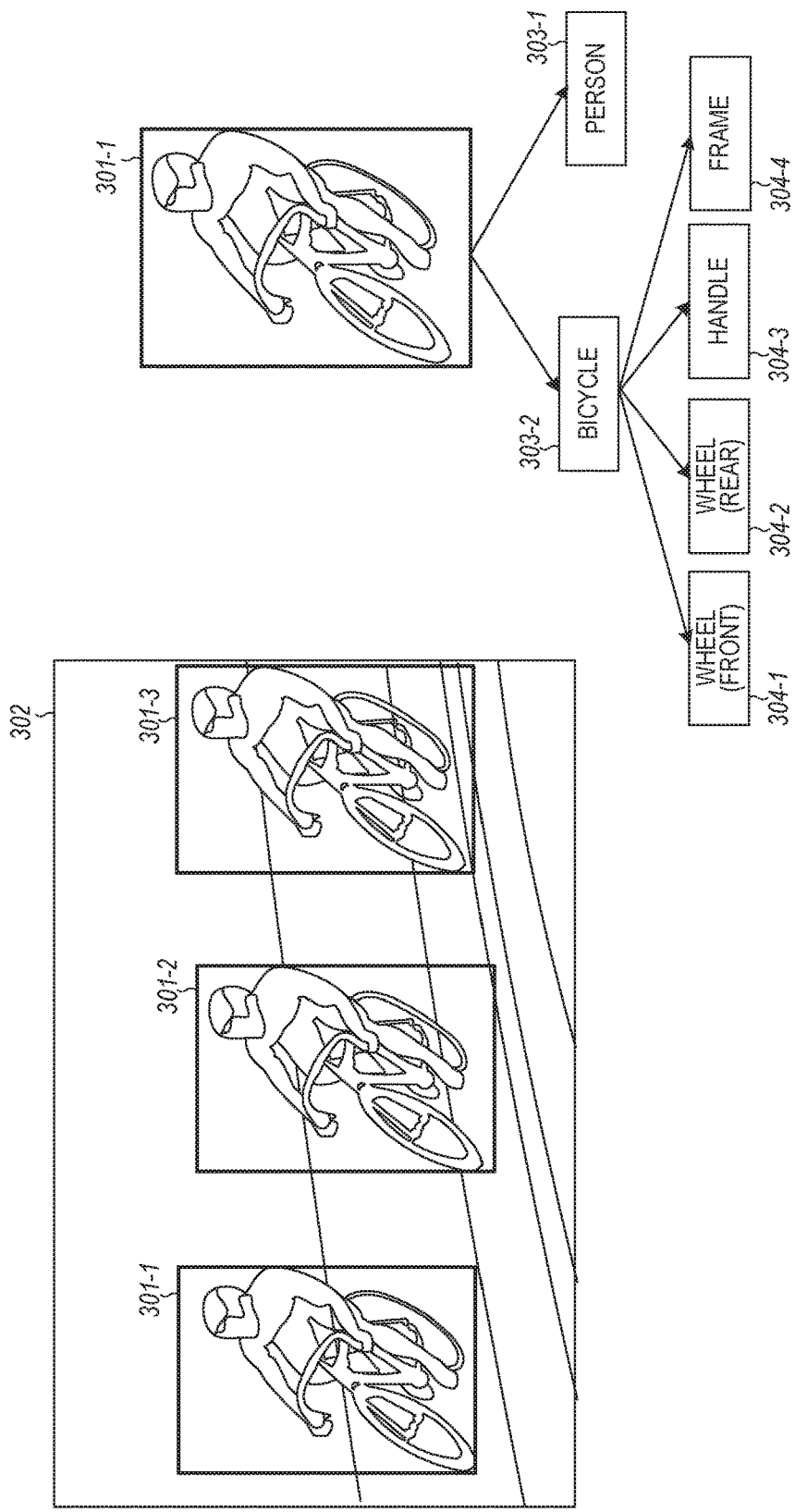
FIG. 3 indicates a manner in which an image can be decomposed for an image recognition system, according to an example embodiment.

FIG. 3 indicates a manner in which an image can be decomposed for an image recognition system. FIG. 3 shows that three objects in the image can be decomposed into three individual objects and an individual object further decomposed. In this example, image 302 includes three objects 301-1, 301-2, and 301-3, where object 301-1 is further decomposed into two components: a person 303-1 and a bicycle 303-2. Bicycle 303-2 can be decomposed into components: front wheel 304-1, rear wheel 304-2, handle 304-3, and frame 304-4. The image of bicycle 303-2 can be provided to a learning unit along with a multi-components 304-1, 304-2, 304-3, and 304-4 into which a representation of bicycle 303-2 can be decomposed. Since for a machine, decomposition tasks are challenging, human can guide the decomposition process in the learning stage of a learning module. The decomposition process along with the pose information can provide a unique mechanism to provide an image recognition system. With a human in the decomposition loop, the image recognition system can be further enhanced.

Figure 4:
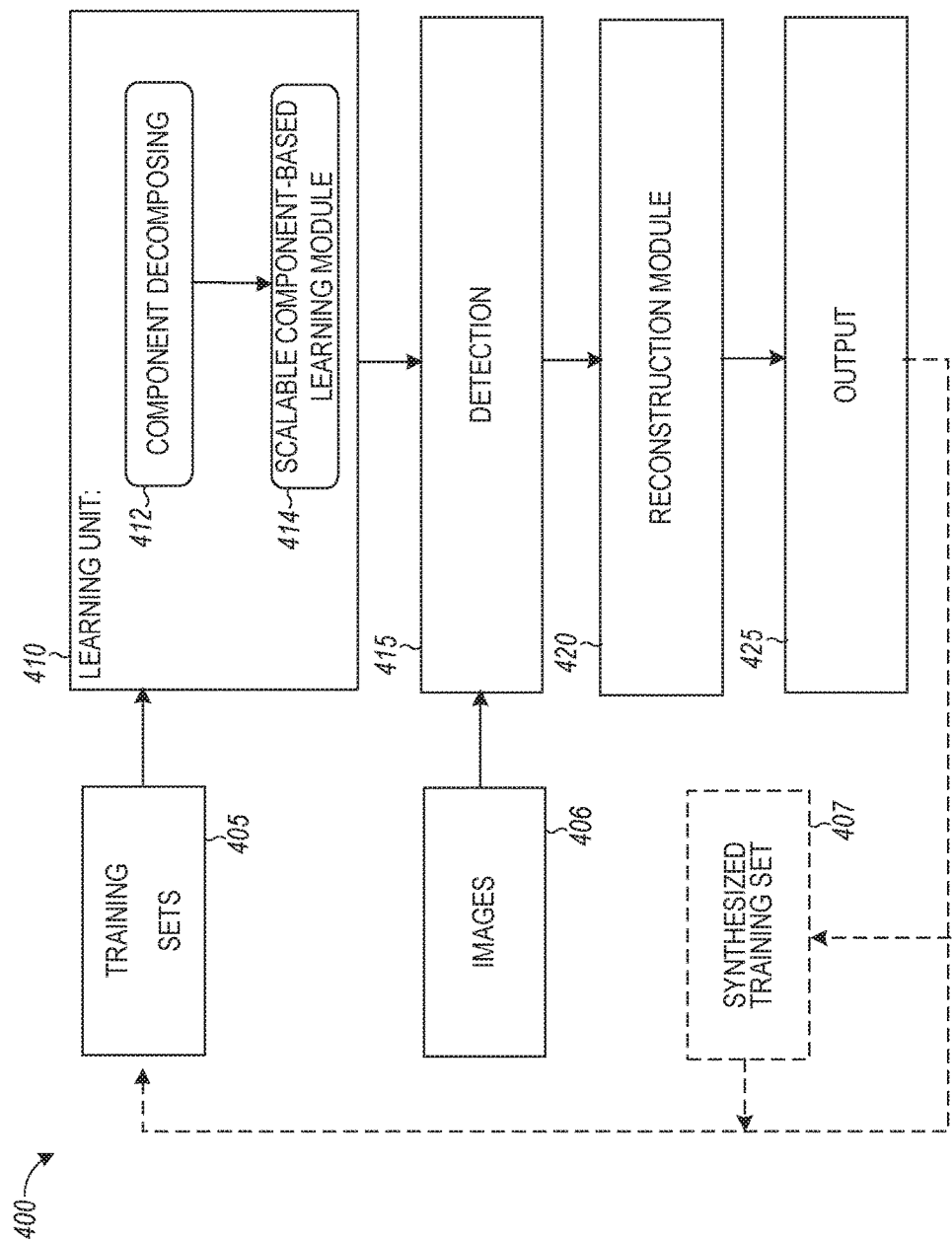
FIG. 4 is a block diagram of an image recognition system, according to an example embodiment.

FIG. 4 is a block diagram of an image recognition system 400 that includes a learning unit 410 that once trained can identify an object and estimate its pose information in an image and/or construct a complete view of the object in the image or a complete sketch of the object. In addition to learning unit 410, image recognition system 400 can include training sets 405, detection 415, a reconstruction module 420, and output 425. Images 406 may be provided in a post-training of learning unit 410 in which an object in an image from images 406 can be detected and pose of the object estimated in detection 415, and processed by reconstruction module 420 with a presentation including the object provided by output 425. Output 425 can provide a complete object rendered on a test image input from images 406. Optionally, the presentation from output 425 can be used in a synthesized training set 407 that can provide additional data to training sets 405 to enhance training of learning unit 410. This includes creating synthesized training images by combining different components from different original images.

Training sets 405 provide one or more images to learning unit 410, where the one or more images acquired by learning unit 410 can be training images used to train a learning module 414 to recognize components of an object in the one or more training images. Each training image can include the object within the image, where the object can have a different appearance in a number of different images of the input training images. Training sets can be created that include images having an object in which the object has a full appearance, a partial appearance, orientation variations, and appearance variations in the training set.

In addition, training images can be augmented with images of objects with partial appearance created from training images of objects with full appearance. These partial appearance images can be created using a number of techniques, including, but not limited to, techniques to crop/split the images, to scale/rotate the images, to add occlusion by extending background regions, and to generate synthetic images based on one or more computer-aided design (CAD) models. Instead of discarding the transforms used in image augmenting, the transforms can be used as pose information in training, where the pose information can be derived from the transforms in performing the techniques to create images with partial appearance. In addition to partial appearance, pose information may also be generated based on deformation descriptors from object template matching the object with a template associated with the object.

Learning unit 410 can operate on one or more images acquired from training sets 405. The operation of the learning unit 410 can include decomposition 412 of an object in one or more images. Decomposition 412 can include decomposing, for each image, the object into components and generating label data for each image. The images and associated label data can be input into learning module 414 to train learning module 414 to recognize the components of the object. Learning module 414 can be a scalable component-based learning module. Learning module 414 may be realized by a neural network or artificial intelligence machine.

A neural network, sometimes referred as an artificial neural network, is a computing system based from considering biological neural networks of animal brains. Such systems progressively improve performance, which is referred to as learning, to perform tasks typically without task-specific programming. For example, in image recognition, a neural network may be taught to identify images that contain an object by analyzing example images that have been tagged with a name for the object and, having learnt the object and name, use the analytic results to identify the object in untagged images. A neural network can be based on a collection of connected units called neurons, where each connection, called a synapse, between neurons can transmit a unidirectional signal with an activating strength that varies with the strength of the connection, the receiving neuron can activate and propagate a signal to downstream neurons connected to it, typically based on whether the combined incoming signals, which can be from potentially many transmitting neurons, are of sufficient strength, which strength is a parameter.

In an embodiment, learning module 414 may include a deep neural network (DNN). A DNN is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed and the sum is passed through what is called a node's activation function, to determine whether and to what extent that signal progresses further through the network to affect the ultimate outcome. DNN uses a cascade of many layers of nonlinear processing units for feature extraction and transformation.

Each successive layer uses the output from the previous layer as input. Higher level features can be derived from lower level features to form a hierarchical representation. The layers following the input layer may be convolution layers that produce feature maps that are filtering results of the inputs and are used by the next convolution layer.

The training of learning module 414 may be based on an overall objectness score of the object, an objectness score of each component of the object, a pose of the object, and a pose of each component of the object for each image input. Objectness is a measure that can act as a class-generic object detector that quantifies how likely it is for an image window to contain an object of any class as opposed to backgrounds. Objectness can be associated with a probability of an image or image window containing a specified object or one of its components.

Decomposition 412 can be implemented with a user interface that provides a mechanism for a human user to provide input into the decomposing process. Having a human in the loop for decomposing can provide semi-supervised component learning. Though decomposition tasks can be challenging for a machine, a human can provide guidance to the decomposition process in the learning stage. Via a user interface, a human in the loop can provide components decomposition using heuristics such as, for example, providing a method or set of rules to proceed from left to right in the images and/or from top to bottom in the images. A human in the loop can provide, via the user interface, a hint of a best fit from generated or matched existing decomposed candidates for the components. A human in the loop can, via the user interface, manually decompose a few typical examples. The heuristic output, candidates of choice from the best fit, and matching with labeled decomposed examples can be input to machine learning models to adjust the machine learning models and/or provide verification of the machine learning models, which can then be provided for review, via the user interface, by the human in the loop.

Images containing the object, decomposition of the object into components, and a file of associated label data can be input into learning module 414 to train learning module 414 as a component-based learning module. For example, learning module 414 can be arranged as a component-based DNN.

Figure 5:
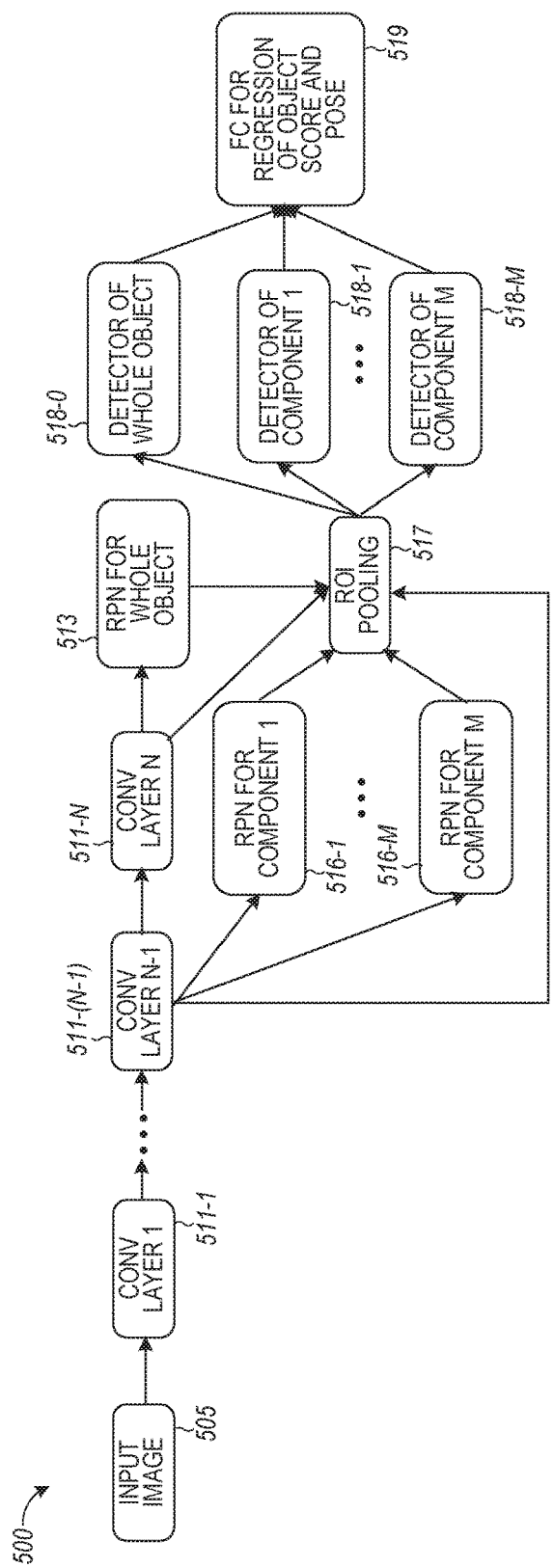
FIG. 5 illustrates a component-based deep neural network architecture operable, once trained, to recognize an object in an image based on components of the object, according to an example embodiment.

FIG. 5 illustrates a component-based DNN architecture 500 operable, once trained, to recognize an object in an image based on components of the object. DNN architecture 500 includes an image input 505. Image input 505 can receive images and label data for each image, which can be input to a cascade of convolution layers 511-1 . . . 511-($n$–1), 511-$n$ with the output of each convolution layer being the input to the next convolution layer. From convolution layer n–1, the output are connected to region proposal networks (RPNs), 516-1 . . . 516-$m$ for each component, 1 . . . m decomposed from the object, respectively. Fully connected layers can be used in region proposal networks. A fully connected layer is a layer whose nodes have full connections to all activations in the previous layer. From convolution layer i, the output is connected to a region proposal network 513 for the object in whole. With respect to a region proposal, which is a conventional structure in a DNN, given an input image, all possible positions where objects can be located can be determined, and the output of this stage can include a list of bounding boxes of likely positions of objects. These are often called region proposals or regions of interest. Region proposal networks for the components of the object use proper finer feature maps than the feature map used by the region proposal network for the object in whole. In some embodiments, the region proposal networks for some components of the object might not use the output of convolution layer n−1, but use the output of convolution layer n−m (e.g. layer n−2 which is before layer n−1).

Region of interest (ROI) pooling 517 can be performed using the region proposals 516-1 . . . 516-m for each component, 1 . . . m, output of convolution layers n−1 and n, and the region proposals for the object in whole. ROI pooling is a neural-net layer used for object detection tasks. The layer operates on a feature map obtained from a deep convolutional network with several convolutions and maximum pooling layers. It takes a section of the input feature map that corresponds to it and scales it to some pre-defined size. The scaling can be performed by operations including dividing each region proposal into equal-sized sections, the number of which can be the same as the dimension of the output. A largest value can be determined in each section and these largest values can be copied to an output buffer. As a result, from a list of rectangles with different sizes, a list of corresponding feature maps with a fixed size can be quickly obtained. The dimension of the ROI pooling output doesn't depend on the size of the input feature map or on the size of the region proposals. It can be determined by the number of sections into which the proposal is divided. Typically, ROI pooling provides enhancements to processing speed. If there are multiple object proposals for an image, the same input feature map may be used for all of the multiple object proposals. In addition to being used for object detection tasks, ROI pooling typically allows reuse of the feature maps from the convolutional network of layers, which can significantly speed up both training and testing time, and allows training in an end-to-end manner. In some embodiments, the ROI pooling layer can combine the region proposals for the object in whole and the region proposals for each components and perform consistency check to rule out inconsistent region proposals. For example, one measurement for one region proposal A for the object in whole may be the number of components whose region proposals are within a tolerance to region proposal A. If this number is below a predefined threshold, then region proposal A can be ruled out.

From ROI pooling 517, the output is connected to a detector of the object 518-9 and detector of component 1 518-1 . . . detector of component m 518-m . . . . These detectors take feature maps generated from the ROI pooling and associated with the object and respective components of the object. Using these detectors a fully connected layer can be implemented for regression of object scores and pose. The pose, for example, may be simply just an orientation bounding box, or includes the pose representation parameters for all degree of freedoms. The regression can include a statistical process for estimating the relationships among variables associated with the object and its components.

In training of the DNN architecture, the regression can include a minimization of a cost function. Training images are input to the DNN learning module, where the DNN learning module can include a region proposal network (RPN) for the components of the objects using proper finer feature maps, region-based detection network (R-CNN), and multiple networks for the components. These networks can share feature maps, which can be realized as convolutional layers such as the cascade of convolution layers 511-1 . . . 511-(n−1), 511-n of component-based DNN architecture 500 of FIG. 5. The RPNs and detectors for the object in whole and its components can be trained jointly or separately.

The output of the DNN can include an overall objectness score, a set of objectness scores for the set of components, a pose of the object, and a set of poses for the set of components, and for training purpose, the discrepancy between labeled data and the output data can be given by the following terms:

discrepancy of overall objectness score=$d(p(o),p_\theta(o))$ sum of discrepancy of objectness scores of components=

$$\sum_{c=0}^{m} d(p_c(o), p_{\theta\_c}(o))$$

discrepancy of pose of the object=$d(\text{pose},\text{pose}_\theta)$ sum of discrepancy of poses of components=$\Sigma_{c=0}^{m} d(\text{pose}_c,\text{pose}_{\theta\_c})$.

In training of the deep neural network for object detection and pose estimation, the following cost function can be used for minimization:

$$\operatorname*{argmin}_{\theta} d(p(o), p_\theta(o)) + \sum_{c=0}^{m} d(p_c(o), p_{\theta\_c}(o)) + d(\text{pose}, \text{pose}_\theta) + \sum_{c=0}^{m} d(\text{pose}_c, \text{pose}_{\theta\_c})$$

where p(o) is the labeled overall objectness score of the whole object, $p_\theta(o)$ is the output objectness score of the whole object; $p_c(o)$ is the labeled objectness score for component c, $p_{\theta\_c}(o)$ is the output objectness score for component c; pose is the labeled pose for the whole object, $\text{pose}_\theta$ is the output pose of the whole object; $\text{pose}_c$ is the labeled pose for component c, $\text{pose}_{\theta\_c}$ is the output pose for component c; and d(x,y) represents the distance between x and y. In some embodiments, different weights might be used for different terms in the cost function to balance the contribution from different terms.

In training, if the cost function value is not within a pre-determined range, based on the known training images, a backpropagation can be used, where backpropagation is a common method of training artificial neural networks that can be used with an optimization method such as a stochastic gradient descent (SGD) method. Use of backpropagation can include propagation and weight update. When an input is presented to the network, it is propagated forward through the network, layer by layer, until it reaches the output layer. The output of the network is then compared to the desired output, using the cost function, and an error value is calculated for each of the nodes in the output layer. The error values can be propagated backwards, starting from the output, until each node has an associated error value which roughly represents its contribution to the original output. Backpropagation can use these error values to calculate the gradient of the cost function with respect to the weights in the network. The calculated gradient can be fed to the selected optimization method to update the weights to attempt to minimize the cost function.

Application of a component-based DNN learning module allows for composable recognition, which is recognition through recognition of components of an object in an image.

In an embodiment, component-level DNN, as discussed above for example, can provide for flexible and reusable training at scale by use of one sub-neural network per component and reuse components for new objects. Data associated with the components can be stored for subsequent application in object recognition. As discussion above, a DNN module can be trained with existing training images. In addition, synthetic images of objects with partial appearance, orientation variations can be used in training.

Figure 6:
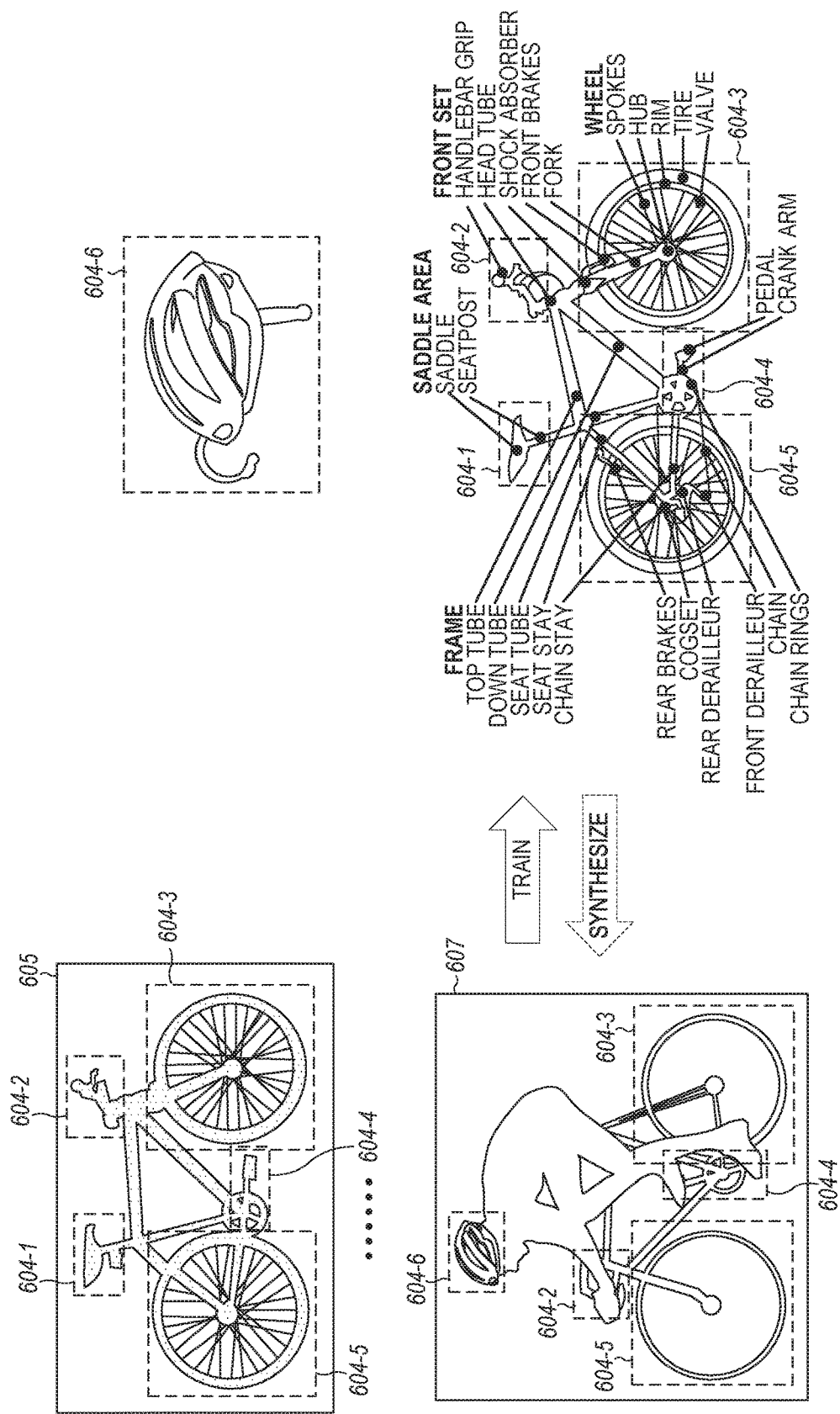
FIG. 6 illustrates operation on an image having an object in a full appearance to train recognitions in which another image can be synthesized, according to an example embodiment.

FIG. 6 illustrates operation on an image having an object in a full appearance to train recognitions in which another image can be synthesized. Image 605 includes a bicycle shown as the combination of five components: a saddle area 604-1, a front set 604-2, a front wheel 604-3, a pedal region 604-4, and a rear wheel 604-5. Upon training, associated components can be identified such as a helmet 604-6 and elements of components 604-1, 604-2, 604-3, 604-4, and 604-5 along with connector components. Saddle area 604-1 can be trained to identify a saddle and a seat post within saddle area 604-1. Front set 604-2 can be trained with an association to a handle bar grip, a head tube, shock absorber, front brakes, and a fork. Front wheel 604-3 can be trained with an association to spokes, hub, rim, tire, and valve. Pedal region 604-4 can be trained with an association to a pedal and crank arm. Rear wheel 604-5 can be trained with an association to rear brakes, cogset, rear derailleur, a front derailleur, a chain, and chain rings. Training can identify a frame group including top tube, down tube, seat tube, seat stay, and chain stay. After training, the trained components can be synthesized such that selected trained components in bounding boxes can be combined to generate image 607 in which helmet 604-6 is combined with a person on the bicycle of image 605 with component saddle area 604-1 occluded by the person.

Figure 7:
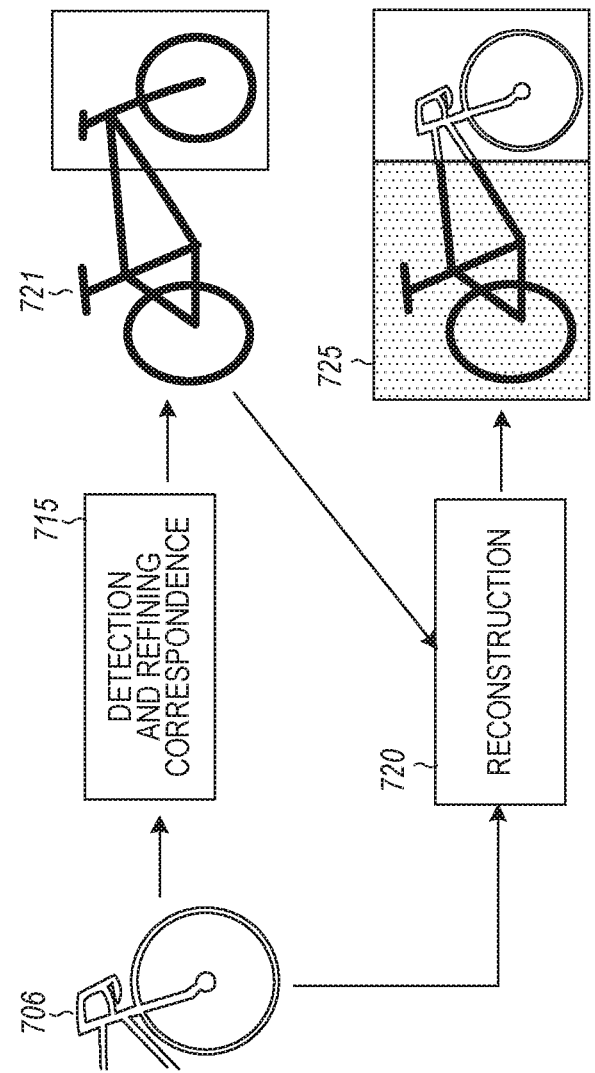
FIG. 7 illustrates detection of an object in a partial appearance and reconstruction of a recovered whole layout of the object, according to an example embodiment.

Using a trained learning module, such as learning module 414, additional images may be detected, such as in detection module 415 of FIG. 4. FIG. 7 illustrates detection of an object in a partial appearance and reconstruction of a recovered whole layout of the object. A partial appearance 706 is provided and an associated object is detected. Optionally, after detecting, correspondence 715 of the associated object and a template 721 can be refined. The correspondence can be provided for reconstruction, for example by reconstruction module 420 of FIG. 4. Template 721 can be combined with partial appearance 706 to produce a whole layout 725, rather than an image. A whole layout can be realized as a sketch. Detection-to-reconstruction can make use of object template representation. Object templates can allow for a composite model with multiple images for different object variations. A set of basis images can be used for reconstruction variations. In addition, synthetic images or wireframes can be created based on object poses using a CAD model. Though this combination is a construction, it can be referred to as a reconstruction since it uses an existing component, namely partial appearance 706.

A complete appearance of the object may be recovered using a generative adversarial network (GAN). GANs can include algorithms implemented by a system of two neural networks that compete against each other. Reconstruction using GAN can be implemented as a DNN based process. In addition to inputting an image in which an object of interest does not have a full appearance, object pose information from detection can be input to the GAN for reconstruction of the full appearance of the object. There are limits and training expenses to GANs such as missing components, if not enough representative training examples are present. A hybrid approach between complete appearance by GAN and a sketch from template can be considered for reconstruction.

Figure 8:
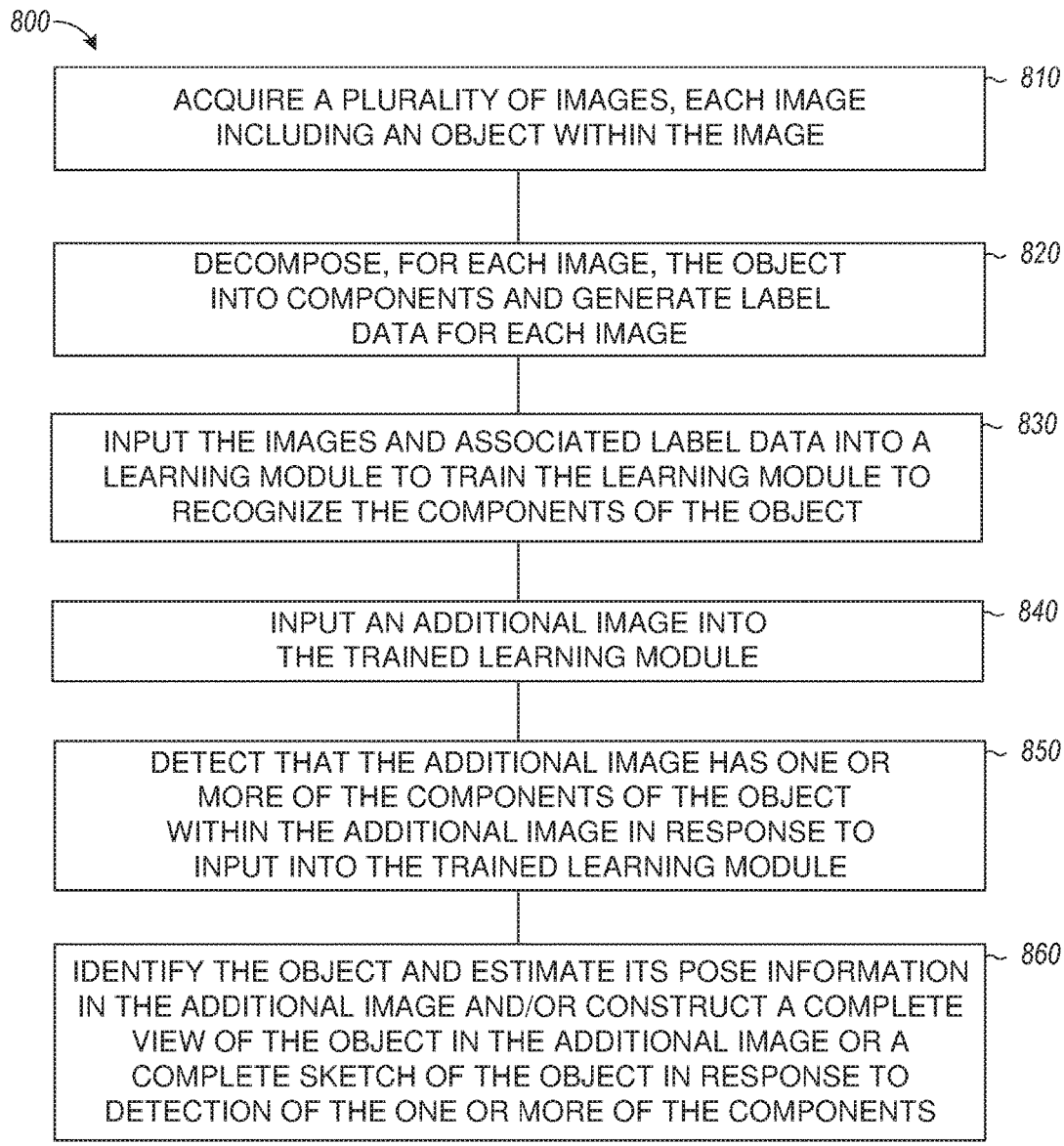
FIG. 8 is a flow diagram of features of an embodiment of an example computer-implemented method of object recognition and reconstruction in images, according to an example embodiment.

FIG. 8 is a flow diagram of features of an embodiment of an example computer-implemented method of object recognition and reconstruction in images. At 810, a plurality of images is acquired, where each image includes an object within the image. The object can have a different appearance in a number of images of the plurality of images. Acquiring the plurality of images can include acquiring one or more of a full appearance of the object, a partial appearance of the object, an orientation variation of the object, or an appearance variation of the object. Acquiring the plurality of images can include creating training images of the object with partial appearance of the object in the training images and labeling the training images with pose information from creating the training images or labeling the training images with pose information based on deformation descriptors from conducting an object template matching.

At 820, for each image, the object is decomposed into components and label data is generated for each image. Decomposing the object in the images into components can include using a user interface to provide user input to decompose the object into the components. Providing user input to decompose the object into components can include using one or more actions from a set of actions, where the set can include using heuristics to decompose the object, using a guess of a best fit from generated or matched existing decomposed candidates, and manually decomposing a number of typical examples.

At 830, the images and associated label data is inputted into a learning module to train the learning module to recognize the components of the object. The training can be based on an overall objectness score of the object, an objectness score of each component of the object, a pose of the object, and a pose of each component of the object for each image input. The learning module can be or include a deep neural network. Training the deep neural network can include training the deep neural network having one sub-neural network per component. Training the deep neural network can include inputting the images and associated label data to a first convolution layer of a plurality of convolution layers i, i=1, ... n−1, in arranged in series such that input to each convolution layer includes an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and n, and the region proposals for the object in whole. The region of interest pooling can include a consistency checking among the region proposals for the object in whole and the region proposals for the components to discard inconsistent region proposals. Training the learning module can include minimizing a cost function generated as a sum of discrepancies between the label data and computed data for a set of items, the set of items including the overall objectness score, the objectness scores of the components, a pose of the object, and the poses of the components.

At 840, an additional image is input into the trained learning module. At 850, that the additional image has one or more of the components of the object within the additional image is detected in response to input into the trained learning module. At 860, the object is identified and its pose information in the additional image is estimated and/or constructing a complete view of the object in the additional image or a complete sketch of the object in response to detection of the one or more of the components. Constructing the complete view can include making a correspondence between an object template and a detected object having a partial appearance. Constructing the complete view can include applying pose information from detecting that the additional image has one or more of the components of the object within the additional image and the additional image as input to a generative adversarial network to construct a full appearance of the object.

Variations of computer-implemented method 800 or methods similar to computer-implemented method 800 can include a number of different embodiments that may or may not be combined depending on the application of such methods and/or the architecture of systems in which such methods are implemented. Such methods can include creating synthetic images as new training images by combining components detected from multiple images. Such methods can also include performing regression of the overall objectness score of the object, the objectness score of each component of the object, the pose of the object, and the poses of the components based on output of region of interest pooling.

A system can be arranged to perform method 800 or methods similar to or identical to method 800 along with other functions. A system can comprise a non-transitory memory storage comprising instructions and one or more processors in communication with the non-transitory memory storage. The one or more processors can execute the instructions to perform operations comprising: acquiring a plurality of images, each image including an object within the image, the object having a different appearance in a number of images of the plurality of images; decomposing, for each image, the object into components and generating label data for each image; inputting the images and associated label data into a learning module to train the learning module to recognize the components of the object, the training being based on an overall objectness score of the object, an objectness score of each component of the object, a pose of the object, and a pose of each component of the object for each image input; inputting an additional image into the trained learning module; detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components.

Variations of the system or similar systems can include a number of different embodiments that may or may not be combined depending on the application of such systems and/or the architecture of systems in which methods, as taught herein, are implemented. Such systems can include operations to include creation of synthetic images as new training images by combining components detected from multiple images. The plurality of images can include one or more of a full appearance of the object, a partial appearance of the object, an orientation variation of the object, or an appearance variation of the object. Acquiring the plurality of images can include creating training images of the object with partial appearance of the object in the training images and labeling the training images with pose information from creating the training images or labeling the training images with pose information based on deformation descriptors from conducting an object template matching.

Variations of the system or similar systems can include decomposition of the object in the images into components to include using a user interface to provide user input to decompose the object into the components. Providing user input to decompose the object into components can include using one or more actions from a set of actions, the set including using heuristics to decompose the object, using a guess of a best fit from generated or matched existing decomposed candidates, and manually decomposing a number of typical examples.

Variations of the system or similar systems can include the learning module being a deep neural network. Training the deep neural network can include training the deep neural network having one sub-neural network per component. Training the deep neural network can include inputting the images and associated label data to a first convolution layer of a plurality of convolution layers i, i=1, ... n−1, n arranged in series such that input to each convolution layer includes an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and in, and the region proposals for the object in whole. The region of interest pooling can include a consistency checking among the region proposals for the object in whole and the region proposals for the components to discard inconsistent region proposals.

Operations can include performing regression of the overall objectness score of the object, the objectness score of each component of the object, the pose of the object, and the poses of the components based on output of region of interest pooling. In an embodiment, training the learning module can include minimizing a cost function generated as a sum of discrepancies between the label data and computed data for a set of items, the set of items including the overall objectness score, the objectness scores of the components, a pose of the object, and the poses of the components.

Variations of the system or similar systems can include constructing the complete view to include making a correspondence between an object template and a detected object having a partial appearance. Constructing the complete view can include applying pose information from detecting that the additional image has one or more of the components of the object within the additional image and the additional image as input to a generative adversarial network to reconstruct a full appearance of the object.

In various embodiments, a non-transitory machine-readable storage device, such as computer-readable non-transitory media, can comprise instructions stored thereon, which, when performed by a machine, cause the machine to perform operations, where the operations comprise one or more features similar to or identical to features of methods and techniques described with respect to method 800, variations thereof, and/or features of other methods taught herein such as associated with FIGS. 1-8. The physical structures of such instructions may be operated on by one or more processors. For example, executing these physical structures can cause the machine to perform operations comprising: acquiring a plurality of images, each image including an object within the image, the object having a different appearance in a number of images of the plurality of images; decomposing, for each image, the object into components and generating label data for each image; inputting the images and associated label data into a learning module to train the learning module to recognize the components of the object, the training being based on an overall objectness score of the object, an objectness score of each component of the object, a pose of the object, and a pose of each component of the object for each image input; inputting an additional image into the trained learning module; detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components.

The instructions can include a number of operations. The operations can include decomposing the object in the images into components to include using a user interface to provide user input to decompose the object into the components. The learning module can include a deep neural network. Training the deep neural network can include training the deep neural network having one sub-neural network per component. Training the deep neural network can include inputting the images and associated label data to a first convolution layer of a plurality of convolution layers i, i=1, ... n−1, n arranged in series such that input to each convolution layer can include an output of a previous convolution layer in the series beginning with convolution layer 2, convolution layer 1 being the first convolution layer; generating, from the output of convolution layer n−1, region proposals for each component; generating, from the output of convolution layer n, region proposals for the object in whole; and performing region of interest pooling using the region proposals for each component, output of convolution layers n−1 and n, and the region proposals for the object in whole. The region of interest pooling can include a consistency checking among the region proposals for the object in whole and the region proposals for the components to discard inconsistent region proposals.

The operations can include performing regression of the overall objectness score of the object, the objectness score of each component of the object, the pose of the object, and the poses of the components based on output of region of interest pooling. Training the learning module can include minimizing a cost function generated as a sum of discrepancies between the label data and computed data for a set of items, where the set of items can include the overall objectness score, the objectness scores of the components, a pose of the object, and the poses of the components.

Operations to acquire the plurality of images can include acquiring one or more of a full appearance of the object, a partial appearance of the object, an orientation variation of the object, or an appearance variation of the object. Acquiring the plurality of images can include creating training images of the object with partial appearance of the object in the training images and labeling the training images with pose information from creating the training images or labeling the training images with pose information based on deformation descriptors from conducting an object template matching.

Further, machine-readable storage devices, such as computer-readable non-transitory media, herein, are physical devices that stores data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory storage 903 of FIG. 9. While memory storage 903 is shown as a multiple component unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers, one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 9:
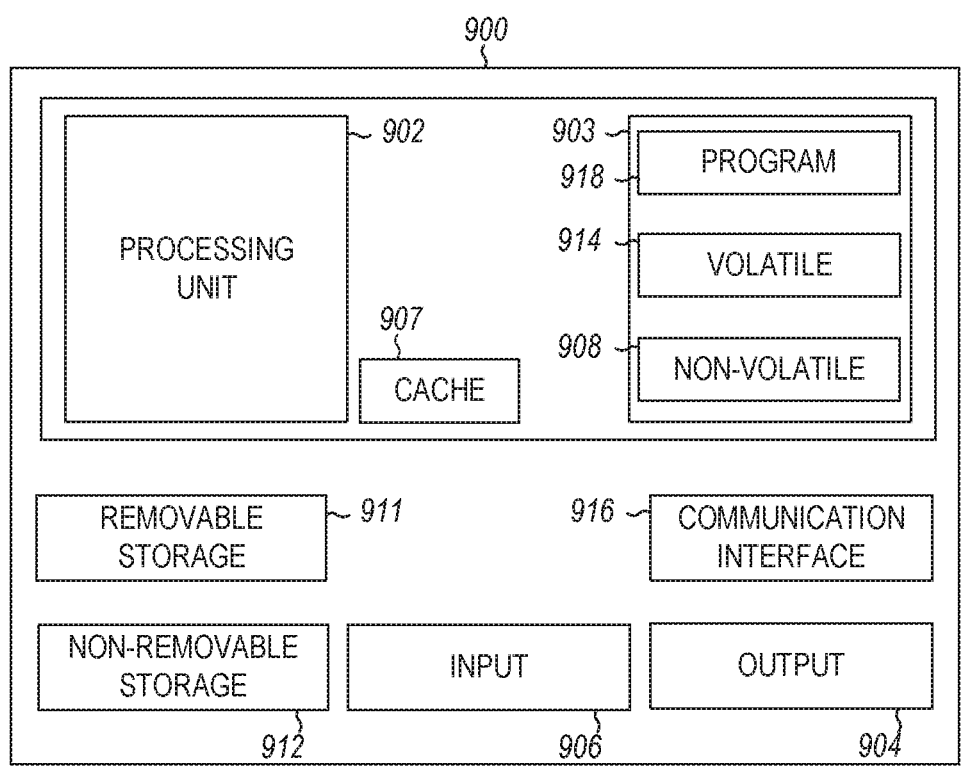
FIG. 9 is a block diagram illustrating circuitry for devices for implementing algorithms and performing methods of object recognition and reconstruction, according to an example embodiment.

FIG. 9 is a block diagram illustrating circuitry for devices for implementing algorithms and performing methods of object recognition and reconstruction, according to the teachings herein. FIG. 9 depicts a device 900 having a non-transitory memory storage 903 storing instructions, a cache 907, and a processing unit 902. Processing unit 902 can include one or more processors operatively in communication with non-transitory memory storage 903 and cache 907. The one or more processors can be structured to execute the instructions to operate device 900 according to any of the methods taught herein. The one or more processors can be structured to execute the instructions to operate other functions of device 900.

Non-transitory memory storage 903 may be realized as machine-readable media, such as computer-readable media, and may include volatile memory 914 and non-volatile memory 908. Device 900 may include or have access to a computing environment that includes a variety of machine-readable media including as computer-readable media, such as volatile memory 914, non-volatile memory 908, removable storage 911, and non-removable storage 912. Such machine-readable media may be used with instructions in one or more programs 918 executed by device 900. Cache 907 may be realized as a separate memory component or part of one or more of volatile memory 914, non-volatile memory 908, removable storage 911, or non-removable storage 912. Memory storage can include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Device 900 may include or have access to a computing environment that includes input 906 and output 904. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to device 900, and other input devices. Device 900 may operate in a networked environment using a communication connection to connect to one or more other devices that are remote. Such remote devices may be similar to device 900 or may be different types of devices having features similar or identical to features of device 900 or other features, as taught herein. The remote devices may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 902 of the device 900. A hard drive, CD-ROM, and RAM are some examples of articles including a non-transitory computer-readable medium such as a storage device. The terms machine-readable medium, computer-readable medium, and storage device do not include carrier waves to the extent carrier waves are deemed transitory. Storage can also include networked storage such as a storage area network (SAN).

In various embodiments, a non-transitory machine-readable storage device can comprise instructions stored thereon, which, when performed by a machine, cause the machine to perform operations to provide a means for operating as associated with FIGS. 1-8. The physical structures of such instructions may be operated on by one or more processors, such as one or more processors of processing unit 903.

Device 900 can be realized as a computing device that may be in different forms in different embodiments, as part of a network. For example, device 900 may be a smartphone, a tablet, smartwatch, other computing device, or other types of devices having wireless communication capabilities, where such devices include components to engage in the distribution and storage of items of content, as taught herein. Devices, such as smartphones, tablets, smartwatches, and other types of device having wireless communication capabilities, are generally collectively referred to as mobile devices or user equipment. In addition, some of these devices may be considered as systems for the functions and/or applications for which they are implemented. Further, although the various data storage elements are illustrated as part of the device 900, the storage may also or alternatively include cloud-based storage accessible via a network, such as the Internet or server based storage.

Figure 10:
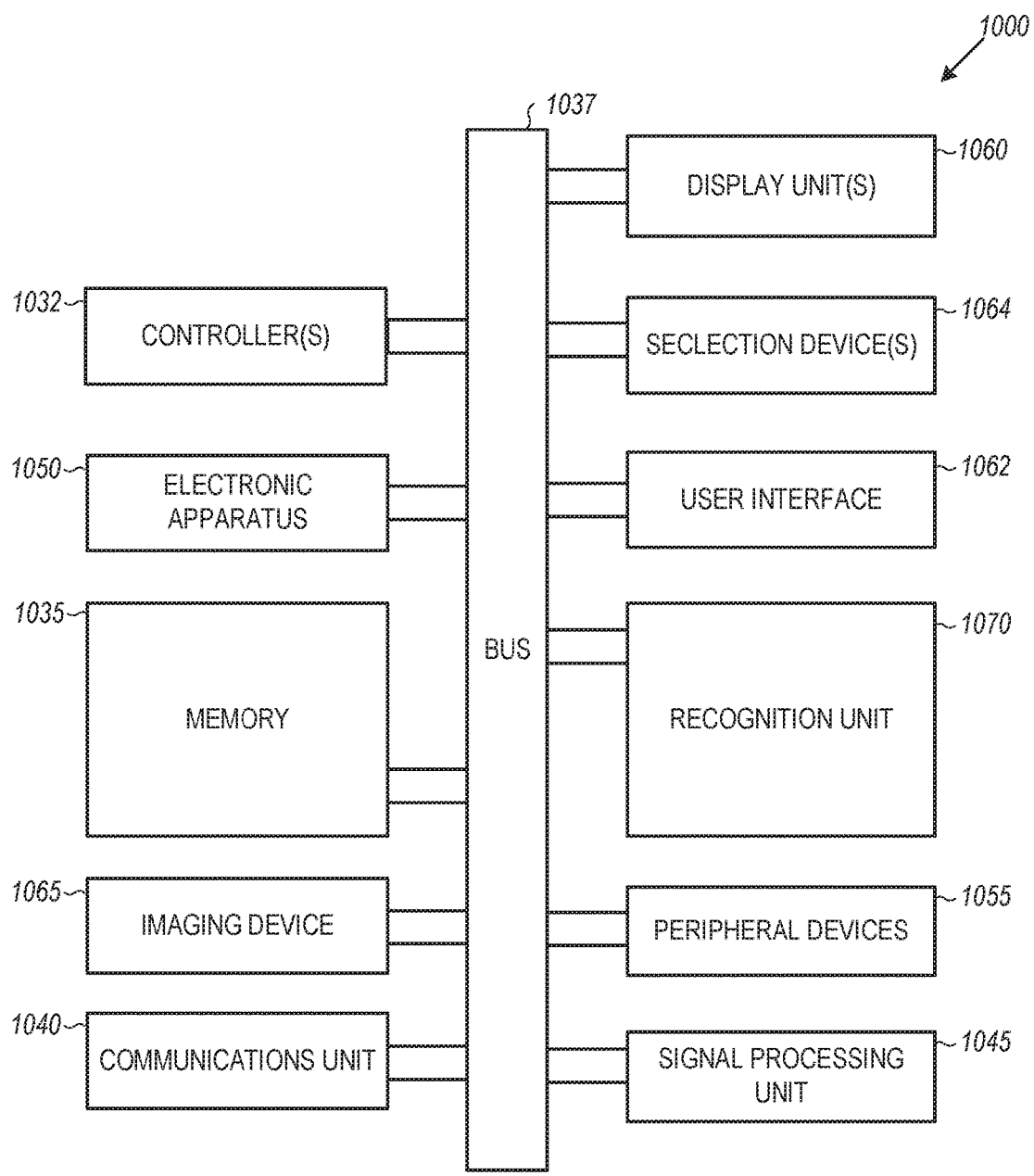
FIG. 10 is a block diagram of features of an embodiment of an example system having a recognition unit, according to an example embodiment.

FIG. 10 is a block diagram of features of an embodiment of an example system 1000 having a recognition unit 1070. Recognition unit 1070 may be implemented to recognize and reconstruct objects in an image, where the systems and methods address appearance variation, orientation variation, and occlusion of portions of the object in the image. System 1000 may be integrated into systems that have functions including detection applications including but not limited to applications to identify an object in an image and estimate its pose information and/or construct a complete view of the object in the image or a complete sketch of the object in response to detection of one or more components of the object. Such systems may include monitoring systems that generate an action in response to detection of objects or arrangements of objects in images such as monitoring videos.

System 1000 may also include a number of components such as control circuitry 1032, memory 1035, communications unit 1040, signal processing unit 1045, electronic apparatus 1050, peripheral devices 1055, display unit(s) 1060, user interface 1062, selection device(s) 1064, and image device 1065. Control circuitry 1032 can be realized as one or more processors, where such processors may operate as a single processor or a group of processors. Processors of the group of processors may operate independently depending on an assigned function. Control circuitry 1032 can be realized in one or more ASICs. Control circuitry 1032 may be realized in one or more DSPs. In controlling operation of the components of system 1000 to execute schemes associated the functions for which system 1000 is designed, control circuitry 1032 can direct access of data to and from a database.

System 1000 can include control circuitry 1032, memory 1035, and communications unit 1040 arranged to operate as a processing unit to control management of recognition unit 1070 and to perform operations on data signals collected by recognition unit 1070. For example, control circuitry 1032, memory 1035, and communications unit 1040 can be arranged to identify an object in an image and estimate its pose information and/or construct a complete view of the object in the image or a complete sketch of the object in response to detection of one or more components of the object. A set of one or more images can be generated using imaging device 1065. A set of one or more images may be acquired using communications unit 1040. Depending on the application, communications unit 1040 may use combinations of wired communication technologies and wireless technologies.

Memory 1035 can include a database having information and other data such that system 1000 can operate on data to perform functions of system 1000. Memory 1035 may store training sets of images and label data accessible for operation by recognition unit 1070. Signal processing unit 1045 may be distributed among the components of system 1000 including memory 1035 and/or electronic apparatus 1050.

System 1000 can also include a bus 1037, where bus 1037 provides electrical conductivity among the components of system 1000. Bus 1037 may include an address bus, a data bus, and a control bus, where each may be independently configured. Bus 1037 may be realized using a number of different communication mediums that allows for the distribution of components of system 1000. Use of bus 1037 can be regulated by control circuitry 1032. Bus 1037 may be operable as part of a communications network to transmit and receive signals including data signals and command and control signals.

In various embodiments, peripheral devices 1055 may include drivers to provide voltage and/or current input to recognition unit 1070, additional storage memory and/or other control devices that may operate in conjunction with control circuitry 1032 and/or memory 1035. Display unit(s) 1060 can be arranged with a screen display that can be used with instructions stored in memory 1035 to implement user interface 1062 to manage the operation of recognition unit 1070 and/or components distributed within system 1000. Such a user interface can be operated in conjunction with communications unit 1040 and bus 1037. Display unit(s) 1060 can include a video screen or other structure to visually project data/information and images. System 1000 can include a number of selection devices 1064 operable with user interface 1062 to provide user inputs to operate signal processing unit 1045 or its equivalent. Selection device(s) 1064 can include a touch screen or a selecting device operable with user interface 1062 to provide user inputs to operate signal processing unit 1045 or other components of system 1000.

In various embodiments, a system can be designed to recognize and reconstruct objects with partial appearance via multi-component recognition and representation. Via a user interface, a human can interact in a decomposition phase of the training of a learning module of the system. A method, as taught herein, can be implemented to train and learn object model information from images with full appearance, images with partial appearance, and images with orientation/pose variations for the objects. A method, as taught herein, can be implemented to recognize the object of partial appearance and reconstruct its whole layout using deep neural network learning via multi-component recognition and representation. A method, as taught herein, can be implemented as semi-supervised component learning with a human in the loop to conduct semi-supervised operations. Such systems and methods can provide added features to products and solutions, such as autonomous systems, safe city, mobile phones, and IoT devices. The added features are enhancements to these systems and methods to provide the capability to recognize obstacles and partial objects, reconstruct and return structural scene information in multiple levels, and indicate information in blind spots such as blind spots in monitoring systems.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system operable to recognize and reconstruct objects in images, the system comprising:
   a non-transitory memory storage comprising instructions; and
   one or more processors in communication with the non-transitory memory storage, wherein the one or more processors execute the instructions to perform operations comprising:
      acquiring a plurality of images, each image including an object within the image, the object having a different appearance in a number of images of the plurality of images;
      decomposing, for each image, the object into components and generating label data for each image;
      inputting the images and associated label data into a learning module to train the learning module to recognize the components of the object, the training being based on an overall objectness score of the object, an objectness score of each component of the object, a pose of the object, and a pose of each component of the object for each image input;
      inputting an additional image into the trained learning module;
      detecting that the additional image has one or more of the components of the object within the additional image in response to input into the trained learning module; and
      identifying the object and estimating its pose information in the additional image and/or constructing a complete view of the object in the additional image or a complete sketch of the object in response to detection of the one or more of the components, wherein training the learning module includes minimizing a cost function generated as a sum of discrepancies between the label data and computed data for a set of items, the set of items including the overall objectness score, the objectness scores of the components, the pose of the object, and the poses of the components.

2. The system of claim 1, wherein decomposing the object in the images into components includes using a user interface to provide user input to decompose the object into the components.

3. The system of claim 2, wherein providing user input to decompose the object into components includes using one or more actions from a set of actions, the set including using heuristics to decompose the object, using a guess of a best fit from generated or matched existing decomposed candidates, and manually decomposing a number of typical examples.

4. The system of claim 1, wherein the learning module is a deep neural network.

5. The system of claim 1, wherein the plurality of images includes one or more of a full appearance of the object, a partial appearance of the object, an orientation variation of the object, or an appearance variation of the object.

6. The system of claim 1, wherein acquiring the plurality of images includes creating training images of the object with partial appearance of the object in the training images and labeling the training images with pose information from creating the training images or labeling the training images with pose information based on deformation descriptors from conducting an object template matching.

7. The system of claim 1, wherein constructing the complete view includes applying pose information from detecting that the additional image has one or more of the components of the object within the additional image and the additional image as input to a generative adversarial network to reconstruct a full appearance of the object.

8. A system operable to recognize and reconstruct objects in images, the system comprising:
   a non-transitory memory storage comprising instructions; and
   one or more processors in communication with the non-transitory memory storage, wherein the one or more processors execute the instructions to perform operations comprising:
      acquiring a plurality of images, each image including an object within the image, the object having a different appearance in a number of images of the plurality of images;
      decomposing, for each image, the object into components and generating label data for each image;
      inputting the images and associated label data into a learning module to train the learning module to recognize the components of the object, the training being based on an overall objectness score of the object, an objectness score of each component of the object, a pose of the object, and a pose of each component of the object for each image input;

inputting an additional image into the trained learning module;

detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components, wherein the learning module is a deep neural network and training the deep neural network includes inputting the images and associated label data to a first convolution layer of a plurality of convolution layers i, i=1, . . . n−1, n arranged in series such that input to each convolution layer includes an output of a previous convolution layer in the series beginning with convolution layer 2, convolution layer 1 being the first convolution layer;

generating, from the output of convolution layer n−1, region proposals for each component;

generating, from the output of convolution layer n, region proposals for the object in whole; and performing region of interest pooling using the region proposals for each component, output of convolution layers n−1 and n, and the region proposals for the object in whole.

9. The system of claim 8, wherein the region of interest pooling includes a consistency checking among the region proposals for the object in whole and the region proposals for the components to discard inconsistent region proposals.

10. A computer-implemented method comprising:

acquiring a plurality of images, each image including an object within the image, the object having a different appearance in a number of images of the plurality of images;

decomposing, for each image, the object into components and generating label data for each image;

inputting the images and associated label data into a learning module to train the learning module to recognize the components of the object, the training being based on an overall objectness score of the object, an objectness score of each component of the object, a pose of the object, and a pose of each component of the object for each image input;

inputting an additional image into the trained learning module;

detecting that the additional image has one or more of the components of the object within the additional image in response to input into the trained learning module; and identifying the object and estimating its pose information in the additional image and/or constructing a complete view of the object in the additional image or a complete sketch of the object in response to detection of the one or more of the components, wherein training the learning module includes minimizing a cost function generated as a sum of discrepancies between the label data and computed data for a set of items, the set of items including the overall objectness score, the objectness scores of the components, the pose of the object, and the poses of the components.

11. The computer-implemented method of claim 10, wherein decomposing the object in the images into components includes using a user interface to provide user input to decompose the object into the components.

12. The computer-implemented method of claim 11, wherein providing user input to decompose the object into components includes using one or more actions from a set of actions, the set including using heuristics to decompose the object, using a guess of a best fit from generated or matched existing decomposed candidates, and manually decomposing a number of typical examples.

13. The computer-implemented method of claim 10, wherein the learning module is a deep neural network.

14. The computer-implemented method of claim 13, wherein training the deep neural network includes inputting the images and associated label data to a first convolution layer of a plurality of convolution layers i, i=1, . . . n−1, n arranged in series such that input to each convolution layer includes an output of a previous convolution layer in the series beginning with convolution layer 2, convolution layer 1 being the first convolution layer;

generating, from the output of convolution layer n−1, region proposals for each component;

generating, from the output of convolution layer n, region proposals for the object in whole; and performing region of interest pooling using the region proposals for each component, output of convolution layers n−1 and n, and the region proposals for the object in whole.

15. The computer-implemented method of claim 10, wherein acquiring the plurality of images includes acquiring one or more of a full appearance of the object, a partial appearance of the object, an orientation variation of the object, or an appearance variation of the object.

16. The computer-implemented method of claim 10, wherein acquiring the plurality of images includes creating training images of the object with partial appearance of the object in the training images and labeling the training images with pose information from creating the training images or labeling the training images with pose information based on deformation descriptors from conducting an object template matching.

17. The computer-implemented method of claim 10, wherein constructing the complete view includes making a correspondence between an object template and a detected object having a partial appearance.

18. The computer-implemented method of claim 10, wherein constructing the complete view includes applying pose information from detecting that the additional image has one or more of the components of the object within the additional image and the additional image as input to a generative adversarial network to construct a full appearance of the object.

* * * * *